US011203423B2

(12) United States Patent
Karem et al.

(10) Patent No.: US 11,203,423 B2
(45) Date of Patent: Dec. 21, 2021

(54) USE OF INDIVIDUAL BLADE CONTROL ON A PROPELLER OR ROTOR IN AXIAL FLIGHT FOR THE PURPOSE OF AERODYNAMIC BRAKING AND POWER RESPONSE MODULATION

(71) Applicant: Karem Aircraft, Inc., Lake Forest, CA (US)

(72) Inventors: Abe Karem, North Tustin, CA (US); Benjamin Tigner, Laguna Beach, CA (US)

(73) Assignee: Karem Aircraft, Inc., Lake Forest, CA (US)

( * ) Notice: Subject to any disclaimer, the term of this patent is extended or adjusted under 35 U.S.C. 154(b) by 821 days.

(21) Appl. No.: 15/996,325

(22) Filed: Jun. 1, 2018

(65) Prior Publication Data

US 2018/0346111 A1 Dec. 6, 2018

Related U.S. Application Data

(60) Provisional application No. 62/513,925, filed on Jun. 1, 2017, provisional application No. 62/513,930, filed on Jun. 1, 2017.

(51) Int. Cl.
*B64C 27/80* (2006.01)
*B64C 29/00* (2006.01)
*B64C 27/72* (2006.01)
*B64D 27/10* (2006.01)
*B64D 27/24* (2006.01)

(52) U.S. Cl.
CPC .............. *B64C 27/80* (2013.01); *B64C 27/72* (2013.01); *B64C 29/0033* (2013.01); *B64C 2027/7205* (2013.01); *B64D 27/10* (2013.01); *B64D 27/24* (2013.01)

(58) Field of Classification Search
CPC . B64C 27/80; B64C 27/72; B64C 2027/7205; F02K 1/66
See application file for complete search history.

(56) References Cited

U.S. PATENT DOCUMENTS 5,054,998 A * 10/1991 Davenport ............. B64D 33/04
416/1
5,381,985 A * 1/1995 Wechsler ................ B64C 11/48
244/12.4

(Continued)

*Primary Examiner* — Brian M O'Hara
(74) *Attorney, Agent, or Firm* — Fish IP Law, LLP (57) ABSTRACT

Systems and methods are contemplated for favorably improving flight dynamics of aircraft, including enhanced aerodynamic braking and improved flight maneuverability. Air braking systems selectively position a first set of blades at a negative thrust pitch to product a net negative thrust across first and second sets of blades, while balancing torque of the drive shafts to zero. First and second sets of IBC blades can be driven by the same shaft or torque-linked shafts. Flight maneuver systems operate a powerplant at a high power mode, and dissipate the energy from the high power output by positioning a first set of IBC blades at a low efficiency pitch while maintaining constant thrust. As increased or rapid flight maneuverability is required, the first set of blades is positioned toward a high efficiency pitch to instantly increase thrust to the aircraft without requiring a related increase in energy output from the powerplant.

19 Claims, 8 Drawing Sheets

(56) References Cited

U.S. PATENT DOCUMENTS

| | | |
|---|---|---|
| 10,253,784 B2* | 4/2019 | Fulayter ................ F04D 29/325 |
| 10,710,734 B2* | 7/2020 | Sankrithi ............... B64D 27/24 |
| 10,752,352 B2* | 8/2020 | Brand .................... B64C 27/28 |
| 2002/0187041 A1 | 12/2002 | Arnold |
| 2005/0067527 A1 | 3/2005 | Petersen |
| 2010/0127119 A1 | 5/2010 | Waide |
| 2015/0298803 A1 | 10/2015 | Halcom et al. |
| 2020/0088108 A1* | 3/2020 | Klein ....................... F02C 3/10 |

\* cited by examiner

Figure 7 - Lift and drag forces due to representative airfoil section angle of attack are resolved into thrust and torque based on the forward flight and rotational-tangential airspeed conditions

Figure 8 - The polar curve for the representative airfoil describes the relationship between lift and drag coefficients for particular Reynolds and Mach number operating conditions

Figure 9 - A differential between pairs of opposing blades can generate braking force while simultaneously dissipating absorbed energy

Figure 10 - Braking force increases with increasing differential pitch between opposing blade pairs; braking force effectiveness grows nonlinearly as the driving braking blades stall Figure 11 - Braking loads on the rotor can be controlled using rotor RPM in addition to differential collective Figure 12 - Torque demand increases with increasing differential pitch between opposing blade pairs; efficiency detuning of the rotor grows nonlinearly as the differential grows

USE OF INDIVIDUAL BLADE CONTROL ON A PROPELLER OR ROTOR IN AXIAL FLIGHT FOR THE PURPOSE OF AERODYNAMIC BRAKING AND POWER RESPONSE MODULATION

PRIORITY

This application claims priority to U.S. Provisional Application Ser. No. 62/513,925 (filed Jun. 1, 2017) and U.S. Provisional Application Ser. No. 62/513,930 (filed Jun. 1, 2017), the disclosures of which are each incorporated herein by reference.

FIELD OF THE INVENTION

The field of the invention is rotorcraft.

BACKGROUND

Propellers and rotors comprise lifting surfaces azimuthally distributed around the axis of a rotating shaft. They are generally utilized to provide propulsive forces for controlling the motion of an aircraft. Propellers may have one or more blades, and examples with two, three, four, five, six, and seven blades are common.

Some propellers utilize blades where blade pitch (lifting surface angle of incidence relative to the tangential direction due to shaft rotation) is mechanically fixed (fixed-pitch propellers). Other propellers, and some rotors, incorporate pitch-control mechanisms, enabling blade pitch for all blades to simultaneously be adjusted (collective pitch propellers and rotors). Many rotors also incorporate pitch control mechanisms that enable controlling both the collective pitch control, and repeating sinusoidal pitch variation as a function of rotor blade azimuth (swash plate pitch control); these mechanisms produce identical pitch as a function of azimuth for each blade.

Individual blade control ("IBC") represents an extension beyond swashplate control, wherein the pitch angle of each blade can be independently controlled as a function of time (or as a function of blade azimuth depending on application). Such individual blade control removes a swash plate restriction to sinusoidal pitch trajectory versus azimuth, as well as the limitation that each blade follow the same pitch trajectory.

Propellers and rotors in axial flight (as in the case of a tiltrotor in wing-borne flight) are generally used to create thrust in the axial direction, but propellers are also sometimes used to provide negative thrust, or aerodynamic braking forces. Air braking is generally used either to decelerate an aircraft from high speed to lower speed flight or to manage the descent angle of an aircraft in constant speed descending flight.

For controllable propellers and rotors, the amount of thrust produced and amount of torque required to drive the rotor are functions of blade (collective) pitch, shaft RPM, axial flight speed, and atmospheric conditions. For fixed shaft RPM, axial flight speed, and atmospheric conditions, the amount of thrust is often regulated by adjusting blade pitch. Higher blade pitch generally produces higher thrust and requires higher drive torque input from the drive system. Lower blade pitch generally produces less thrust and requires less torque input; sufficiently low pitch will produce reverse thrust (braking), and will generally cause reverse shaft torque to be applied by the propeller to the drive system. This condition is commonly known as wind-milling.

The relationships between propeller pitch, thrust, and shaft torque (for fixed RPM, speed, and atmospheric conditions) are approximately linear in the normal operating region, but important nonlinearities exist. At both very high airfoil angles of attack and very low airfoil angles of attack, aerodynamic separation causes large deviation from the linear relationships by both reducing the airfoil lift curve slope and by creating excess airfoil drag.

When an aircraft uses reverse blade pitch to decelerate or control descent angle, energy is absorbed from the airstream flowing through the propeller or rotor disk. This energy absorption produces shaft torque input, and results in rotational acceleration that increases shaft RPM, unless friction or some other mechanism acts to dissipate the absorbed energy. The amount of braking effect achievable in a given flight condition depends on the amount of energy the system is configured to dissipate. In many applications (such as turboprop aircraft) the primary dissipative mechanism is friction in the drive system, which increases as a function of increasing shaft speed, thus the practical amount of air braking effect achievable is limited by the maximum RPM for which the propeller or rotor is rated.

Propeller and rotor analysis frequently describes the aerodynamic effect of an entire blade by reference to a simplified blade consisting of a single representative airfoil located at a representative radial station along the blade, often taken as 75% of the propeller or rotor radius. The aerodynamic environment in which the representative airfoil operates results from the superposition of (axial) flight speed, axial inflow (flow perturbation resulting from the propeller's influence on the flow field), and the tangential velocity of the airfoil due to the rotary motion about the drive shaft. The airfoil's angle of attack is herein taken as the angle between the airfoil's geometric chord line and the direction of the combination of the above velocities. For the purposes of the below discussion of aerodynamic braking, blade pitch angle is taken to differ from the angle of the representative airfoil only by a fixed offset value.

Thus, one issue is that conventional propeller aerodynamic braking dissipates energy absorbed from the airstream using friction in the drive train, and is limited by the thermal and mechanical limits of the drive system.

What are still needed are systems, methods, and mechanisms in which propellers or rotors can achieve greater braking effectiveness than that achieved with conventional propeller or rotor air braking systems or otherwise known in the art.

Further, most helicopters and rotorcraft are powered by turboshaft engines. Despite their many advantages, turboshaft engines have the disadvantage that they respond slowly to changes in power command, frequently with well over a one-second response delay depending on operating condition. This slow power response is one factor limiting the aggressiveness with which many rotorcraft can maneuver. And since aggressive maneuverability is an important metric of operational utility, especially for military applications, enhanced power response quickness would provide valuable operational advantages.

As such, another issue is that during operating periods where enhanced maneuverability is required of a rotorcraft, generally requiring greater torque from the drive shaft, increases in power delivered by an engine can be slow relative to desired changes in power delivered through the blades.

What are still needed are mechanisms in which blades of a rotorcraft can deliver significantly increased power significantly faster than could be achieved by relying solely on increases in engine power.

SUMMARY OF THE INVENTION

The inventive subject matter contemplates systems, devices, and methods to improve aircraft flight dynamics, for example improving aerodynamic braking with reduced (or zero) torque stress on the drive shaft, as well as increasing flight maneuverability independent of rapid engine response by rapidly modulating required driveshaft torque.

With respect to aerodynamic braking, it is contemplated that while many applications of IBC produce non-sinusoidal blade pitch as a function of azimuth, preferred embodiments described herein produce differential blade pitch between the different blades; in other words, IBC used for differential collective. Viewed from another perspective, methods and uses of IBC for air braking use different combinations of blades to absorb and to dissipate energy, as an alternate to or in combination with using friction in the drive train.

One approach to rapidly modulating required driveshaft torque involves operating the engine at a higher than required power, while dissipating the excess power in a way that can be modulated quickly. Thus, rapid variations in the amount of dissipated power offer enhanced maneuverability and responsiveness. Rotorcraft operators normally seek to maximize the lifting efficiency of rotor systems because additional efficiency reduces the power required to lift a load and reduces fuel consumption. But a rotor capable of rapidly modulating its lifting efficiency further provides enhanced maneuverability and fuel efficiency.

An air brake system is contemplated having a first drive shaft that drives a first set of blades, which provides a first thrust to the system. Likewise, a second drive shaft drives a second set of blades, providing a second thrust to the system. The first set of blades are adjustable between a positive thrust pitch and a negative thrust pitch, and are selectively adjusted toward the negative thrust pitch such that the sum of the first and second thrust is negative (e.g., first thrust is $-(\alpha+\beta)$, second thrust is $\alpha$, and sum of thrusts is $-(\alpha+\beta)+\alpha=-\beta$). While it is generally contemplated that the second thrust is positive, the inventive subject matter includes conditions where the first and second thrusts are each negative.

The first drive shaft is preferably the same as the second drive shaft, but it is further contemplated that the first and second drive shafts are alternatively different shafts, but are torque-connected to each other. In preferred embodiments, either the first or second (or both) drive shaft is driven by at least one of an electric motor and a turboshaft engine (e.g., hybrid, all electric, all turboshaft, etc).

The first set of blades is typically operated by individual blade control ("IBC"), and includes an odd number of blades, though an even number of blades is also contemplated. Preferably at least one of the first and second set of blades includes either an Optimum Speed Rotor ("OSR") or an Optimum Speed Tilt Rotor ("OSTR").

It is further contemplated that inventive systems include a controller (e.g., integrated circuit, etc) to control operation of the first and second sets of blades such that (i) the first set of blades applies a first torque to the first drive shaft, and (ii) the second set of blades applies a second torque to the second drive shaft, wherein the sum of the first and second torques balances out to zero for at least a period of 3 seconds. It should be appreciated that, in such embodiments, the first and second drive shafts are preferably the same drive shaft, or at least are torque-connected. Systems can also (or alternatively) include controllers (or portions thereof) that reduce the rotational speed of the first set of blades when the first set of blades is operating with a negative thrust pitch.

A variety of aircraft are contemplated to employ the systems of the inventive subject matter, including rotorcraft. In preferred embodiments, the rotorcraft is a tiltrotor craft needing to moderate steep descent angles in fixed-wing flight. Electric vertical take-off and landing ("eVTOL") craft are also contemplated to employ the inventive systems, preferably storing the energy captured by the air braking system in an electric battery aboard the craft.

Flight maneuver systems, methods, and devices are also contemplated. Such systems include a first drive shaft to drive a first set of blades, which provides a first thrust, and a second drive shaft to drive a second set of blades, which likewise provides a second thrust. The first set of blades is adjustable between a low efficiency pitch and a high efficiency pitch. The first and second drive shafts are driven by a powerplant that has a high power mode. When the powerplant is in the high power mode, the first set of blades is (i) selectively adjusted toward the low efficiency pitch to dissipate energy from the powerplant, or (ii) selectively adjusted toward the high efficiency pitch to increase flight maneuverability. Typically the low efficiency pitch generates a first thrust, and the high efficiency pitch generates a second thrust greater than the first thrust. In some embodiments, the first set of blades is adjusted toward a negative thrust pitch to produce a net negative thrust of the system.

Generally the first drive shaft is the second drive shaft, but embodiments are contemplated where the first and second drive shafts are different, though torque-connected. In some embodiments either the first or second (or both) drive shaft is driven by at least one of an electric motor and a turboshaft engine (e.g., all electric, all turboshaft, hybrid, etc).

The first set of blades is preferably individual blade control ("IBC") blades. At least one of the first and second set of blades typically includes an Optimum Speed Rotor ("OSR") or an Optimum Speed Tilt Rotor ("OSTR").

Systems, methods, and devices of the inventive subject matter are contemplated to be applied to a variety of aircraft, including rotorcraft. In preferred embodiments, flight maneuver systems of the inventive subject matter are employed by military attack helicopters requiring aggressive maneuverability.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

DETAILED DESCRIPTION

The inventive subject matter contemplates systems, devices, methods, and uses of IBC-capable propellers or rotors to modify flight characteristics or dynamics of aircraft, for example (1) to achieve greater aerodynamic braking effectiveness than would otherwise be possible with non-IBC propellers or rotors, or (2) to rapidly modulate the amount of driveshaft torque required to drive a rotor or propeller while maintaining constant thrust (thus varying the effective lifting efficiency of the rotor).

Various objects, features, aspects and advantages of the inventive subject matter will become more apparent from the detailed description of preferred embodiments herein, along with the accompanying drawing figures in which like numerals represent like components.

Aerodynamic Braking

The inventive subject matter provides apparatus, systems and methods in which IBC-capable propellers or rotors are used to achieve greater braking effectiveness than would otherwise be possible with non-IBC propellers or rotors. Note that while many applications of IBC exploit the system's ability to produce non-sinusoidal blade pitch as a function of azimuth, the application disclosed herein alternatively or in combination exploits the system's ability to produce differential blade pitch between the different blades; in other words, IBC is herein used for differential collective pitch, as an alternative or in combination with cyclic pitch.

As described above, normal propeller air braking dissipates energy absorbed from the airstream using friction in the drive train, and is limited by the thermal and mechanical limits of the drive system. IBC-based air braking in contrast uses different combinations of blades to absorb and to dissipate energy.

Figure 5A:
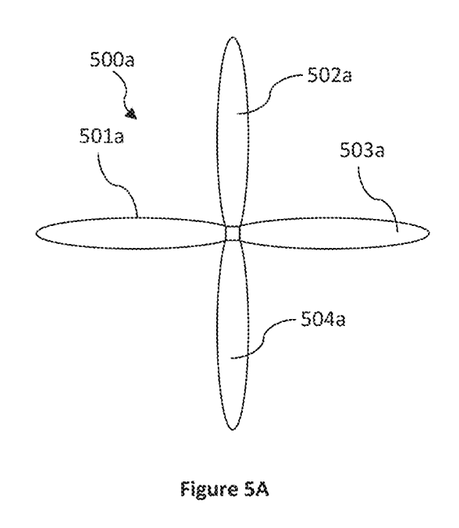
FIG. 5A depicts another rotor of the inventive subject matter.
Figure 9:
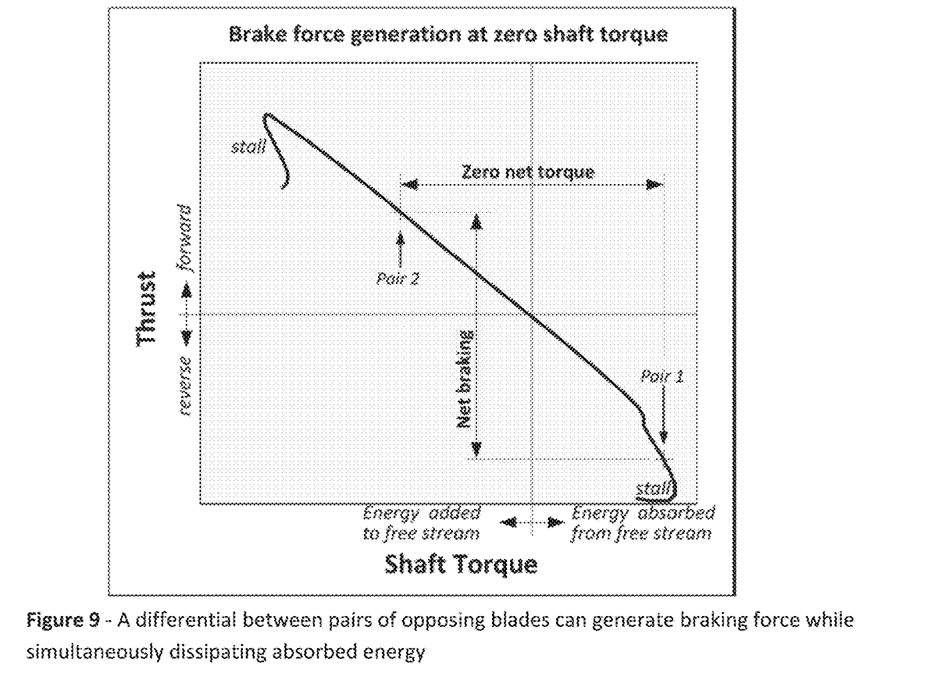
FIG. 9 depicts a representative plot of brake force generation at zero shaft torque.
Figure 10:
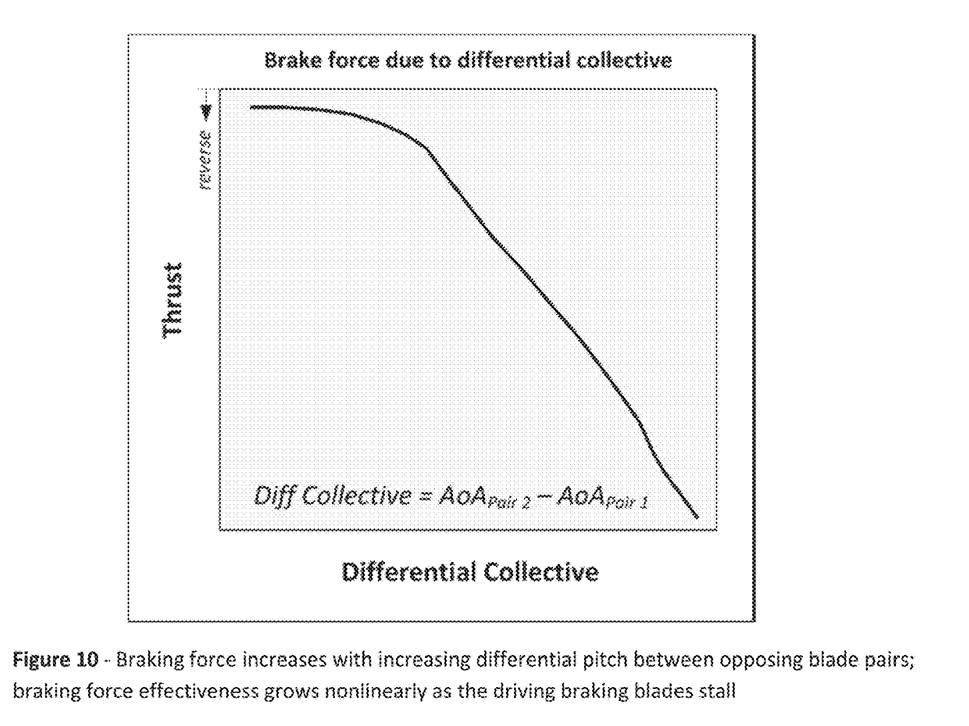
FIG. 10 depicts a representative plot of brake force due to differential collective.

The example of FIG. 5A involves a four-bladed rotor 500a, with blades labeled sequentially around their axis of rotation as blades 501a, 502a, 503a, and 504a, and grouped into two pairs of opposing blades: 501a and 503a (pair 1) and 502a and 504a (pair 2). Energy dissipation is achieved through introduction of differential pitch between pairs 1 and 2. Pair 1 blades are set at a blade pitch for braking, while pair 2 blades are set for thrust. Due to the nonlinearity of the pitch-thrust-torque relationships (see, e.g., FIG. 9), such an arrangement can achieve net braking while simultaneously producing controllable shaft torque, either positive or negative. Variation in the average value of pitch primarily affects the amount of thrust (or braking), while variation in the differential pitch primarily affects the amount of dissipation. Thus propeller RPM can be regulated independent of braking without the need for energy dissipation in the drive train.

Figure 6A:
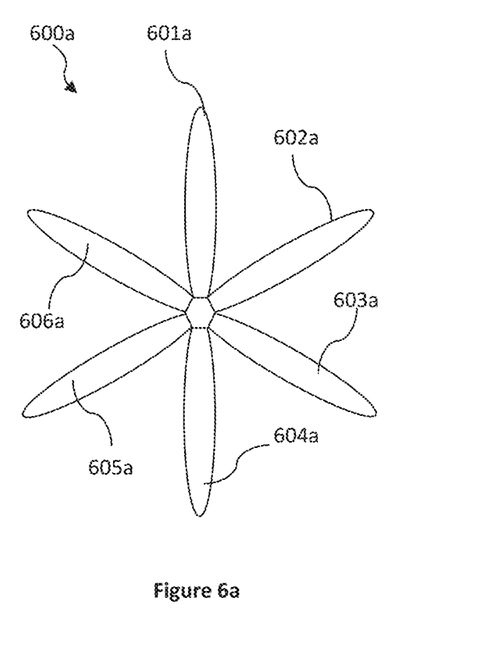
FIG. 6A depicts yet another rotor of the inventive subject matter.

Likewise, the example of FIG. 6A involves six-blade rotor 600a with blades labeled sequentially around their axis of rotation as blades 601a, 602a, 603a, 604a, 605a, and 606a. It should be noted the blades of rotor 600a can be grouped into two groups of three equispaced blades (e.g., group 1 comprising 601a, 603a, and 605a; group 2 comprising 602a, 604a, and 606a) or three groups of two opposing blades (e.g., group 1 comprising 601a and 604a; group 2 comprising 602a and 605a; group 3 comprising 603a and 606a). In the scenario of two groups of three equispaced blades, energy dissipation is achieved through introduction of differential pitch between groups 1 and 2. Group 1 blades are set at a blade pitch for braking, while group 2 blades are set for thrust, as discussed above.

In the scenario of three groups of two opposing blades, energy dissipation can be achieved through introduction of differential pitch between any one of groups 1, 2, and 3, and subgroups thereof. For example, group 1 blades can be set at a blade pitch for braking while group 2 and 3 blades are set for thrust, group 1 and 2 blades can be set at a blade pitch for braking while group 3 blades are set for thrust. Further, each of group 1, 2, and 3 blades can be set at a different pitch. For example, group 1 can be set at a pitch generating negative thrust ($-\alpha$), group 2 can be set at a pitch generating opposing positive thrust ($\alpha$) yielding a net zero thrust, and group 3 can be set at a variable pitch to either brake (negative thrust) or propel (positive thrust) the system.

An example envisions an Optimum Speed Tiltrotor with two 36-foot diameter rotors of 13.5% solidity each. In flight at 300 knots true airspeed, at 400 RPM, such a rotor can produce more than 10,000 lb of braking force while maintaining zero shaft torque. Rotor speed control is maintained by modulating differential collective as needed to accelerate or decelerate the rotor with minor adjustments in shaft torque.

The braking method described above exploits nonlinearity in the pitch-thrust-torque relationships; blade pitch for pairs 1 and 2 are balanced to achieve zero net torque, but the curve nonlinearities mean that the forward thrust of the driving pair is insufficient to offset the braking effect of the dissipative pair. See, e.g., FIG. 9.

Blade Load Moderation Through RPM Reduction

Figure 11:
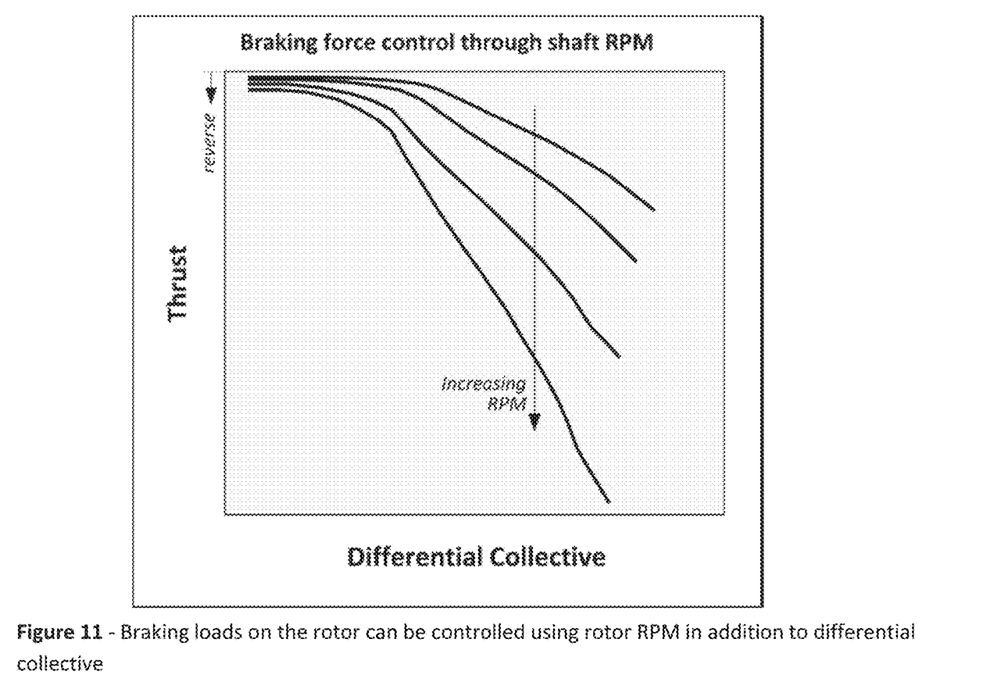
FIG. 11 depicts a representative plot of braking force control through shaft RPM.
Figure 12:
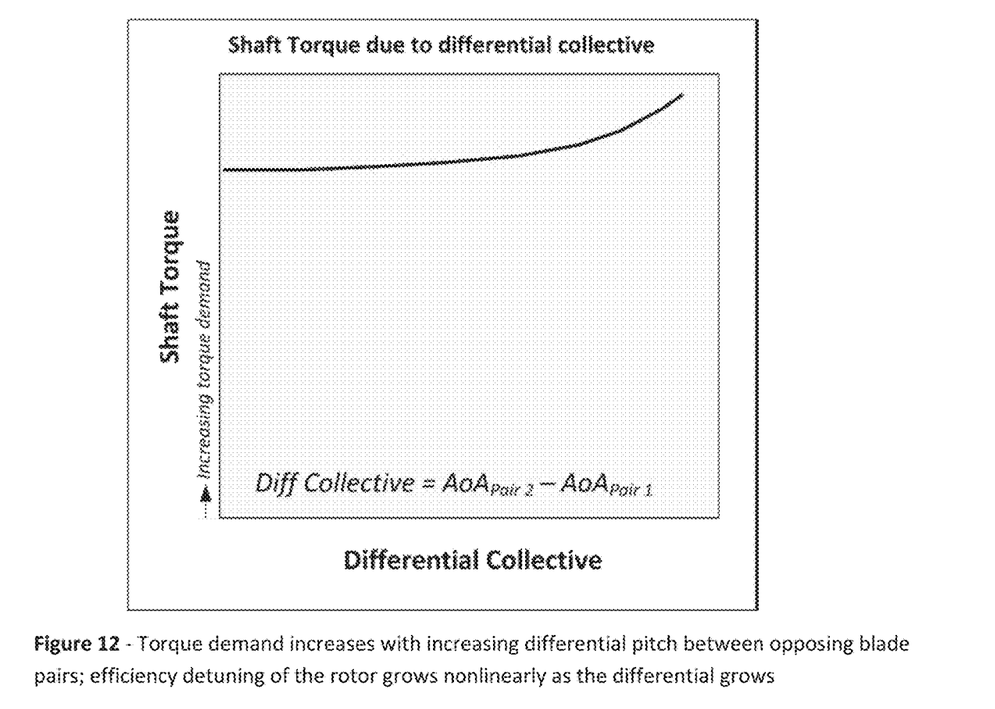
FIG. 12 depicts a representative plot of shaft torque due to differential collective.

The type of braking described herein relies on blade strength to transmit braking loads to the drive shaft. Thus, blades must be designed with sufficient strength to accommodate flight loads associated with the required braking capabilities. Some IBC-capable rotors and propellers are capable of operation across a wide speed range, and such variable-speed operation offers the operational advantage in implementation of the inventive air braking by providing another method of controlling blade loads. Reduction of rotor RPM reduces overall blade loads by reducing the dynamic pressure of the flow over the blade representative section. See, e.g., FIG. 11.

Rapid Modulation of Required Shaft Torque

The inventive subject matter further provides apparatus, systems and methods in which individual blade control is used to rapidly modulate the amount of shaft torque required to drive a rotor while maintaining constant thrust, thus varying the effective lifting efficiency of the rotor. During operating periods where enhanced maneuverability is required of the aircraft, the engine is operated at higher power levels than normally required, with excess power dissipated through intentional rotor efficiency reduction. When an aggressive maneuver demands rapid increases in power, the aircraft modulates the rotor efficiency as needed to unleash the excess power available from the engine. Such rotor efficiency modulation can be achieved on much shorter time scales unattainable by the power response timescales of the engine.

Figure 5B:
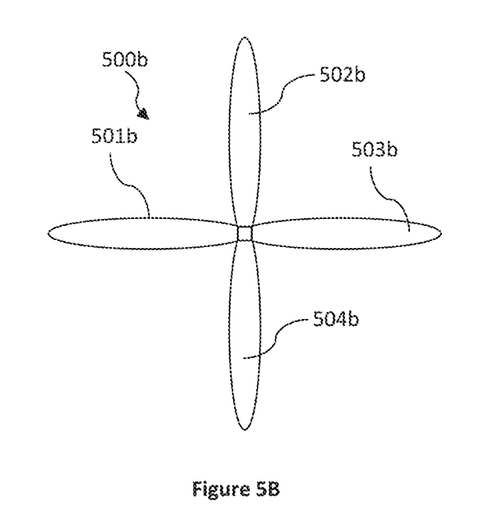
FIG. 5B depicts still another rotor of the inventive subject matter.

The example of FIG. 5B involves another four-bladed rotor 500*b*, with blades labeled sequentially around their axis of rotation as blades 501*b*, 502*b*, 503*b*, and 504*b*, and grouped into two pairs of opposing blades: 501*b* and 503*b* (pair 1) and 502*b* and 504*b* (pair 2). The rotors 5A and 5B can be identical physically, but are operated differently. Energy dissipation is achieved while maintaining constant thrust in hover by introduction of differential pitch between pairs 1 and 2. Pair 1 blades are set at a blade pitch for thrust decreased below their normal hover value, while pair 2 blades are set for increased thrust, such that the total thrust of the rotor is maintained. Due to the nonlinearity of the pitch-thrust-torque relationships (see, e.g., FIG. 9), such an arrangement can achieve independent control over rotor thrust and required shaft torque. Variation in average value of pitch primarily affects the amount of thrust, while variation in the differential pitch primarily affects the amount of shaft torque required.

Figure 6B:
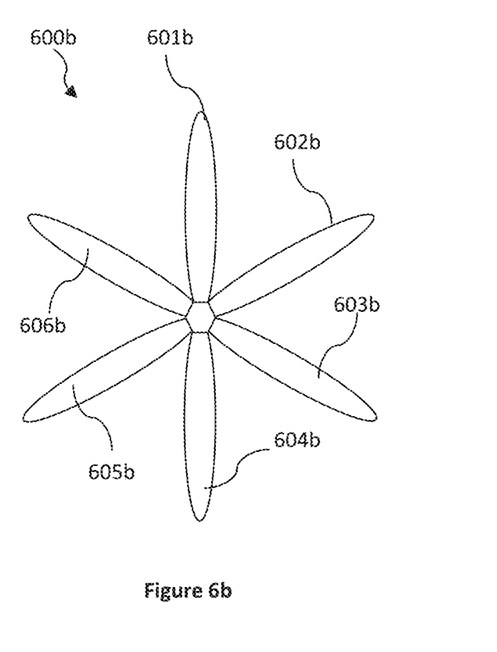
FIG. 6B depicts yet another rotor of the inventive subject matter.
Figure 7:
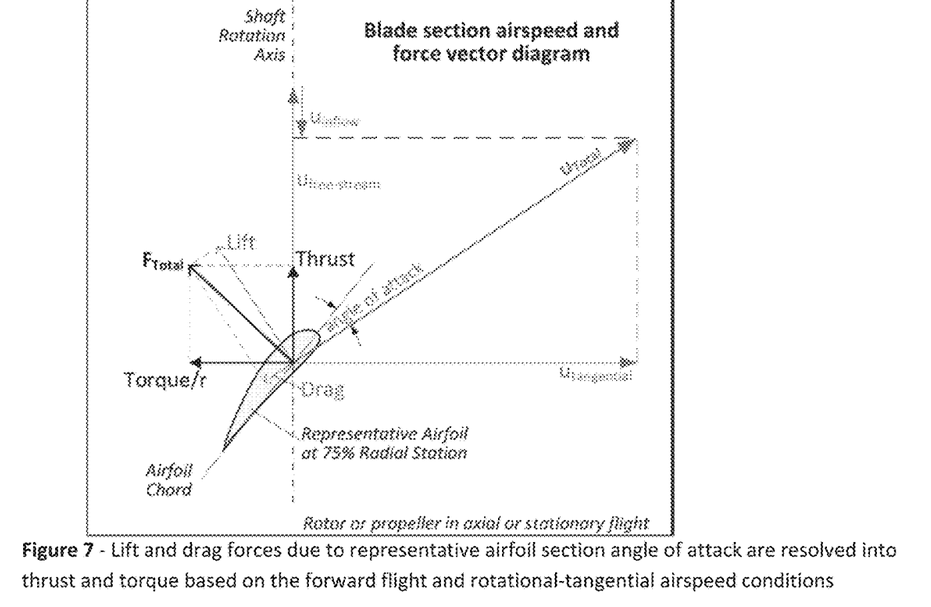
FIG. 7 depicts a representative blade section airspeed and force vector diagram.
Figure 8:
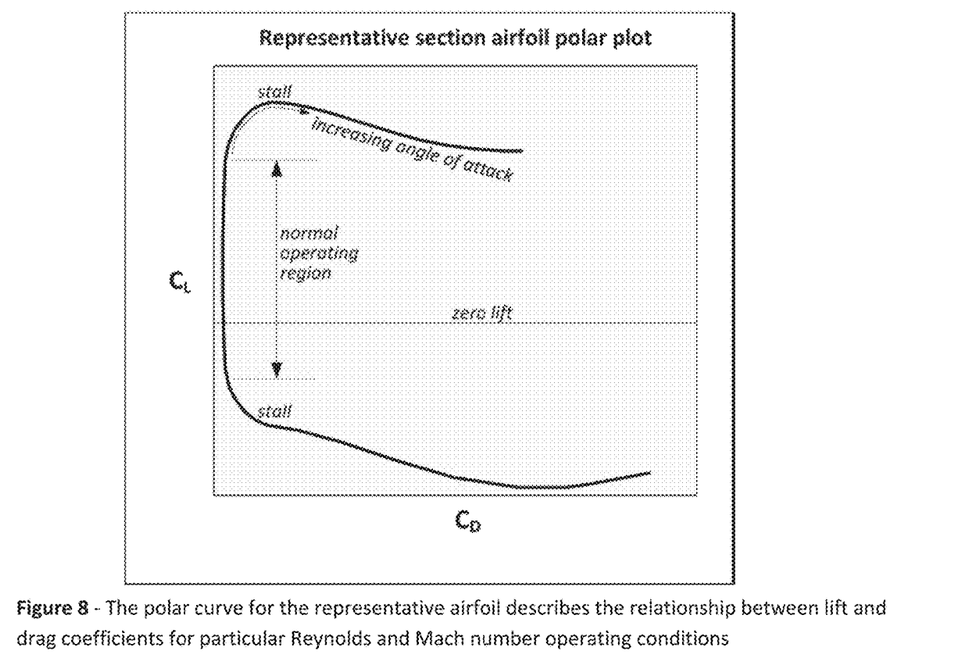
FIG. 8 depicts a representative section airfoil polar plot.

Likewise, the example of FIG. 6B involves six-blade rotor 600*b* with blades labeled sequentially around their axis of rotation as blades 601*b*, 602*b*, 603*b*, 604*b*, 605*b*, and 606*b*. The rotors 6A and 6B can be identical physically, but are operated differently. It should be noted the blades of rotor 600*b* can be grouped into two groups of three equispaced blades (e.g., group 1 comprising 601*b*, 603*b*, and 605*b*; group 2 comprising 602*b*, 604*b*, and 606*b*) or three groups of two opposing blades (e.g., group 1 comprising 601*b* and 604*b*; group 2 comprising 602*b* and 605*b*; group 3 comprising 603*b* and 606*b*). In the scenario of two groups of three equispaced blades, energy dissipation is achieved while maintaining constant thrust in hover by introduction of differential pitch between groups 1 and 2. Group 1 blades are set at a blade pitch for thrust decreased below their normal hover value, while group 2 blades are set for increased thrust, such that the total thrust of the rotor is maintained, as discussed above.

In the scenario of three groups of two opposing blades, energy dissipation while maintaining constant thrust in hover can be achieved through introduction of differential pitch between any one of groups 1, 2, and 3, and subgroups thereof. For example, group 1 blades can be set at a blade pitch for thrust decreased below their normal hover value while group 2 and 3 blades are set for increased thrust, such that the total thrust of the rotor is maintained. Likewise, group 1 and 2 blades can be set at a blade pitch for thrust decreased below their normal hover value while group 3 blades are set for increased thrust, such that the total thrust of the rotor is maintained. Further, each of group 1, 2, and 3 blades can be set at a different pitch (and respective different thrust) such that increases and decreases in thrust from each group balances out to maintain the total thrust of the rotor.

An example envisions an Optimum Speed Tiltrotor with two 36-foot diameter rotors of 13.5% solidity each. In hovering flight at 400 RPM, with each rotor producing a thrust of 12,000 lb, differential collective using IBC can produce torque variations of over 3,000 ft-lb while maintaining constant or controllable thrust. Aircraft maneuver is accomplished by varying thrust as needed, modulated by variations in the average pitch of all blades.

The time response of the torque modulation achieved through differential collective depends on the speed with which the blades can be moved in pitch combined with the time for the flow field to adjust to the modified blade angles. These time delays can be less than a second, and in some cases less than a tenth of a second. Thus IBC-based differential torque represents a quickness improvement over torque modulation achievable using turboshaft engines alone.

Optimum Speed Rotors

To achieve high rotor efficiency in rotor borne and in wingborne flight, a sustained rotor operation over a wide range of rotor RPM (such as 20% to 100%) is necessary. To this end, contemplated embodiments utilize rotor designs having stiffened blades, as disclosed in U.S. Pat. No. 6,007,298 (Karem) "Optimum Speed Rotor" (OSR) and U.S. Pat.

No. 6,641,365 (Karem) "Optimum Speed Tilt Rotor" (OSTR), incorporated herein by reference.

Using the OSR and OSTR teachings, aircraft contemplated herein preferably achieve flap stiffness of each blade that is not less than the product of 100, or even more preferably 200, times the rotor diameter in feet to the fourth power, as measured in lbs-in$^2$, at 30% of the rotor radius as measured from a center of rotor rotation.

Also, using the OSR and OSTR teachings, each blade weight in lbs preferably does not exceed the product of 0.004 times the diameter of the rotor in feet cubed.

Even Vs Odd Blade-Count Propellers and Rotor

The above descriptions treat opposing blades in pairs to avoid creation of undesirable pitching or yawing moments perpendicular to the shaft axis. Thus, most practical applications of the invention will utilize propellers with even numbers of blades, as seen in FIGS. 1, 2A, 2B 5A, 5B, 6A, and 6B. But in applications where perpendicular moments can be tolerated, similar methods could be used with IBC propellers having odd numbers of blades, as in FIGS. 3A, 3B, and 4.

Deployment in Aircraft

FIGS. 1-3B depict deployments of systems of the inventive subject matter in various aircraft, and in various configurations.

Figure 1:
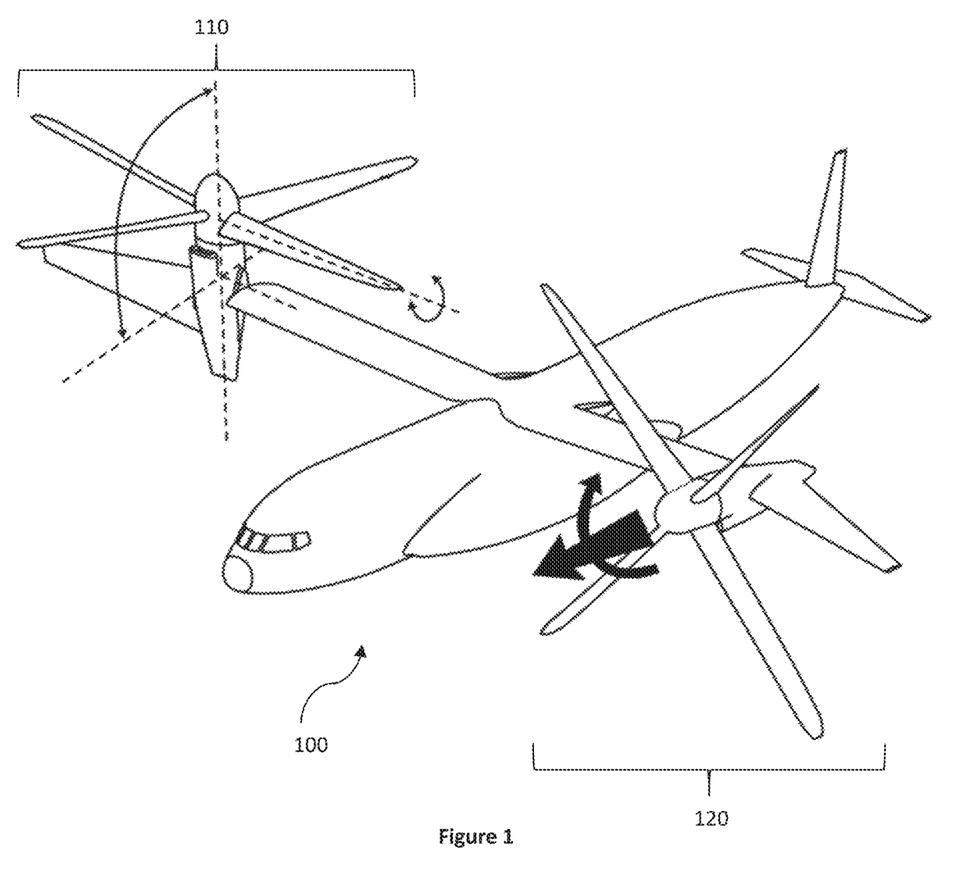
FIG. 1 depicts an aircraft employing a system of the inventive subject matter.

FIG. 1 depicts aircraft 100 with rotor systems 110 and 120. Rotor systems 110 and 120 employ the systems of the inventive subject matter, including air braking systems and flight maneuver systems. For example, embodiments are contemplated where rotor system 110 employs a first type of system (e.g., air braking, flight maneuver, etc) and rotor system 120 employs a second type of system (e.g., air braking, flight maneuver, etc). rotor systems 110 and 120 can employ the same type of system (e.g., both flight maneuver, both air braking, etc) or can each employ a different type of system (e.g., rotor system 110 is flight maneuver, rotor system 120 is air braking). It is further contemplated that a single rotor system can employ more than one system of the inventive subject matter, for example rotor system 110 can employ both flight maneuver and air braking systems at the same time, or can selectively engage one of the flight maneuver system or the air braking system from time to time.

Thus, the systems employed by the aircraft can be variable and/or application-specific, providing drastically increased maneuverability (e.g. employing two flight maneuver systems), substantially increased air braking (e.g., employing two air braking systems), or a balance between increased flight maneuverability and increased air braking (e.g., employing both air braking and flight maneuver systems, in isolation or combination). While rotor systems 110 and 120 are tilt rotor systems, it should be appreciated that other rotor systems are contemplated. Further, it should be appreciated that rotor systems are contemplated that comprise even or odd numbers of blades.

It is contemplated that systems of the inventive subject matter be deployed in an aircraft such that a forward rotor is used for air braking, with the power generated by such air braking transferred electrically to an aft rotor, such that the aft rotor uses the excess energy to generate thrust. Such an application is well suited for conditions where it is desirable to greatly dissipate energy. Alternatively, or in combination, such systems can be used to store regenerated energy from the air braking system back into a battery system of the aircraft.

Figure 2A:
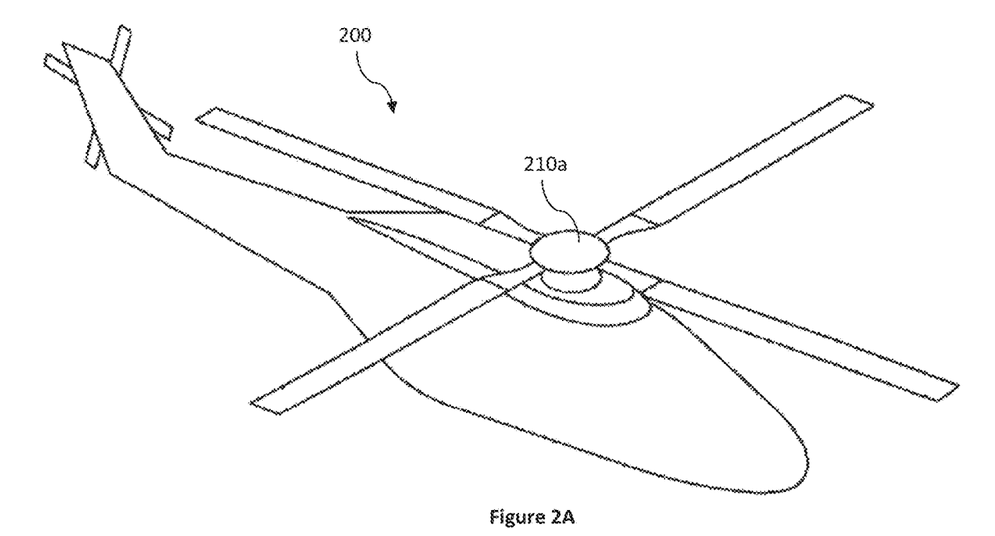
FIG. 2A depicts another aircraft employing a single rotor system of the inventive subject matter.
Figure 2B:
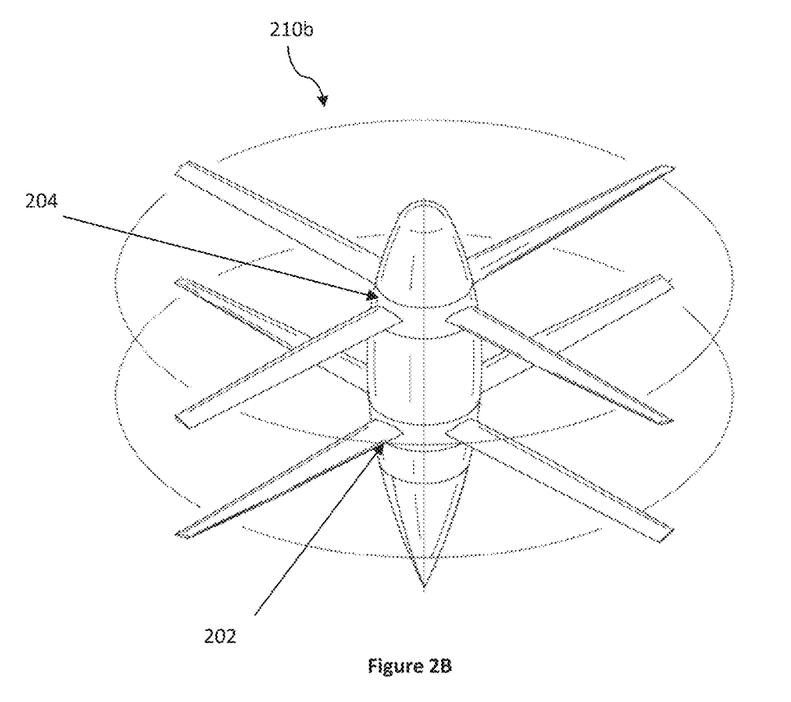
FIG. 2B depicts a dual rotor system of the inventive subject matter that can alternatively be employed by an aircraft.

FIG. 2A depicts aircraft 200 with rotor system 210a, which employs one (or a combination) of the systems of the inventive subject matter (e.g., flight maneuver system, air braking system, etc). While FIG. 2A depicts rotor system 210a as a single rotor systems, it should be appreciated multi rotor systems are also contemplated. For example, FIG. 2B depicts rotor system 210b, which is a dual rotor system comprising rotor 202 and rotor 204. Rotors 202 and 204 share a common drive shaft (not depicted), but it is contemplated that rotors 202 and 204 can each be driven by a different drive shaft that are torque-linked together. It is contemplated that rotor system 210b can employ various systems of the inventive subject matter in isolation or combination as described with respect to FIG. 1.

Figure 3A:
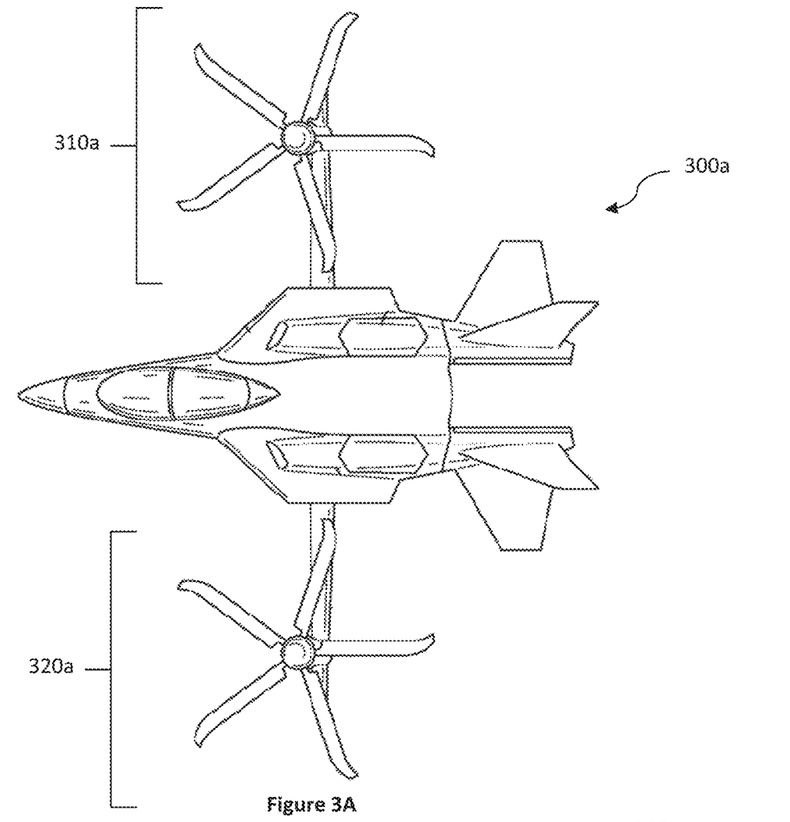
FIG. 3A depicts another aircraft employing a two-rotor system of the inventive subject matter in a side-by-side configuration.
Figure 4:
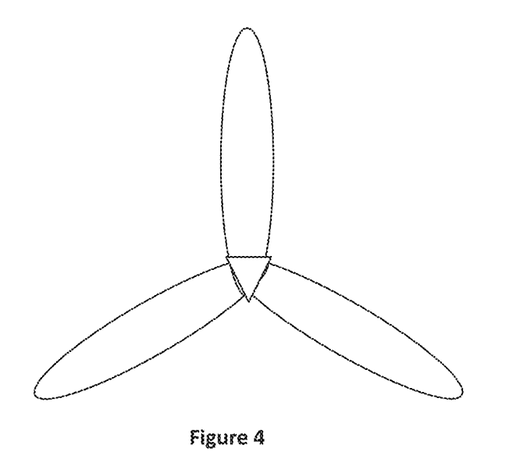
FIG. 4 depicts a rotor of the inventive subject matter.

FIG. 3A depicts aircraft 300a with rotor systems 310a and 320a arranged in a side-to-side configuration and as described with respect to FIG. 1.

Figure 3B:
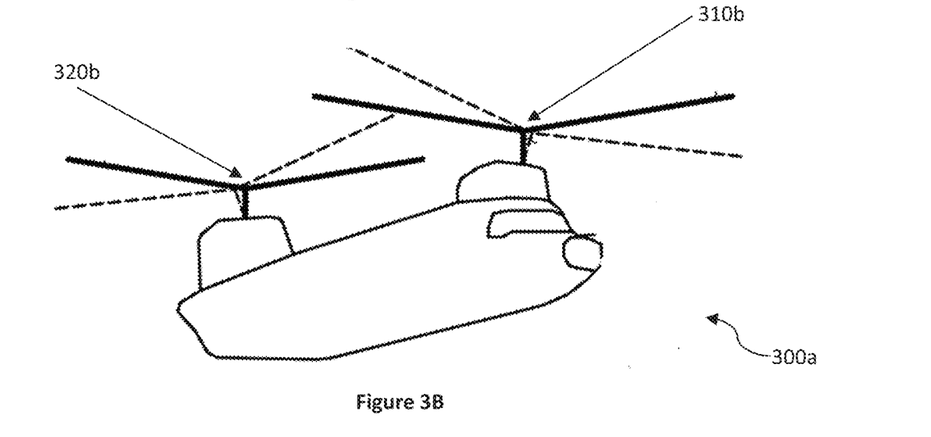
FIG. 3B depicts another aircraft employing a two-rotor system of the inventive subject matter in a front-to-back configuration.

FIG. 3B depicts aircraft 300b with rotor systems 310b and 320b arranged in a front-to-back configuration, where rotor system 310b is positioned toward the fore of aircraft 300b and rotor system 320b is positioned toward the aft of aircraft 300b. The rotor systems are as described herein.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An air brake system comprising:
   a first drive shaft driving a first set of blades; and
   a second drive shaft driving a second set of blades;
   wherein the first set of blades includes a first subset of blades having a pitch configured for thrust, and concurrently a second subset of blades having a pitch configured for negative thrust; and
   wherein combined thrust provided by the first and second sets of blades is negative.

2. The air braking system of claim 1, wherein the first and second drive shafts are connected to form a continuous shaft.

3. The air braking system of claim 1, wherein the first drive shaft is torque-connected to the second drive shaft.

4. The air braking system of claim 1, wherein the pitch of the second subset of blades is operated by individual blade control ("IBC").

5. The air braking system of claim 1, wherein the first set of blades comprises an odd number of blades.

6. The air braking system of claim 1, wherein at least one of the first and second drive shafts is driven by at least one of a electric motor and a turboshaft engine.

7. The air braking system of claim 1, wherein the second set of blades includes a third subset of blades having a pitch configured for thrust, and a fourth subset of blades having a pitch concurrently configured for negative thrust.

8. The air braking system of claim 1, further comprising a controller that controls operation of the first and second sets of blades such that (i) the first set of blades applies a first torque to the first drive shaft, and (ii) the second set of blades applies a second torque to the second drive shaft, wherein the sum of the first and second torques balances out to zero for at least a period of 3 seconds.

9. The air braking system of claim 1, further comprising a controller that lowers rotational speed of the first set of blades when the first set of blades is operating with the negative thrust pitch.

10. The air braking system of claim 1, wherein at least one of the first and second set of blades comprises a rotor selected from the group consisting of an Optimum Speed Rotor ("OSR") and an Optimum Speed Tilt Rotor ("OSTR").

11. The air braking system of claim 1, operationally disposed in a rotorcraft.

12. The air braking system of claim 1, operationally disposed in an electric vertical take-off and landing ("eVTOL").

13. A flight maneuver system comprising:
a first drive shaft driving a first set of blades configured to provide a first thrust; and
a second drive shaft driving a second set of blades configured to provide a second thrust; and
a powerplant driving the first and second drive shafts, and having a high power mode to achieve an immediate high power delivery;
wherein the first set of blades includes a first subset of blades configured with provide a low efficiency pitch, and concurrently a second subset of blades configured with a high efficiency pitch; and
wherein, when the powerplant is in the high power mode, the first set of blades is (i) selectively adjusted toward the low efficiency pitch to dissipate energy from the powerplant, or (ii) selectively adjusted toward the high efficiency pitch to increase flight maneuverability.

14. The flight maneuver system of claim 13, wherein the second thrust greater than the first thrust.

15. The flight maneuver system of claim 13, wherein the first and second drive shafts are connected to form a continuous shaft.

16. The flight maneuver system of claim 13, wherein difference between the low efficiency pitch and the high efficiency pitch is controlled by individual blade control ("IBC").

17. The flight maneuver system of claim 13, wherein at least one of the first and second set of blades comprise a rotor selected from the group consisting of an Optimum Speed Rotor ("OSR") and Optimum Speed Tilt Rotor ("OSTR").

18. The flight maneuver system of claim 14, operationally disposed in military attack helicopter requiring aggressive maneuverability.

19. The flight maneuver system of claim 13, wherein the drive shaft is driven by at least one of an electric motor and a turboshaft engine.

* * * * *